May 26, 1959 J. J. FLEISCHMANN ET AL 2,888,240
FLUID COOLED BARREL CYLINDER FOR TURBINES
Filed March 7, 1956 3 Sheets-Sheet 1

Inventors
John J. Fleischmann
Charles W. Wilson
by Howard B. Scheckman
Attorney

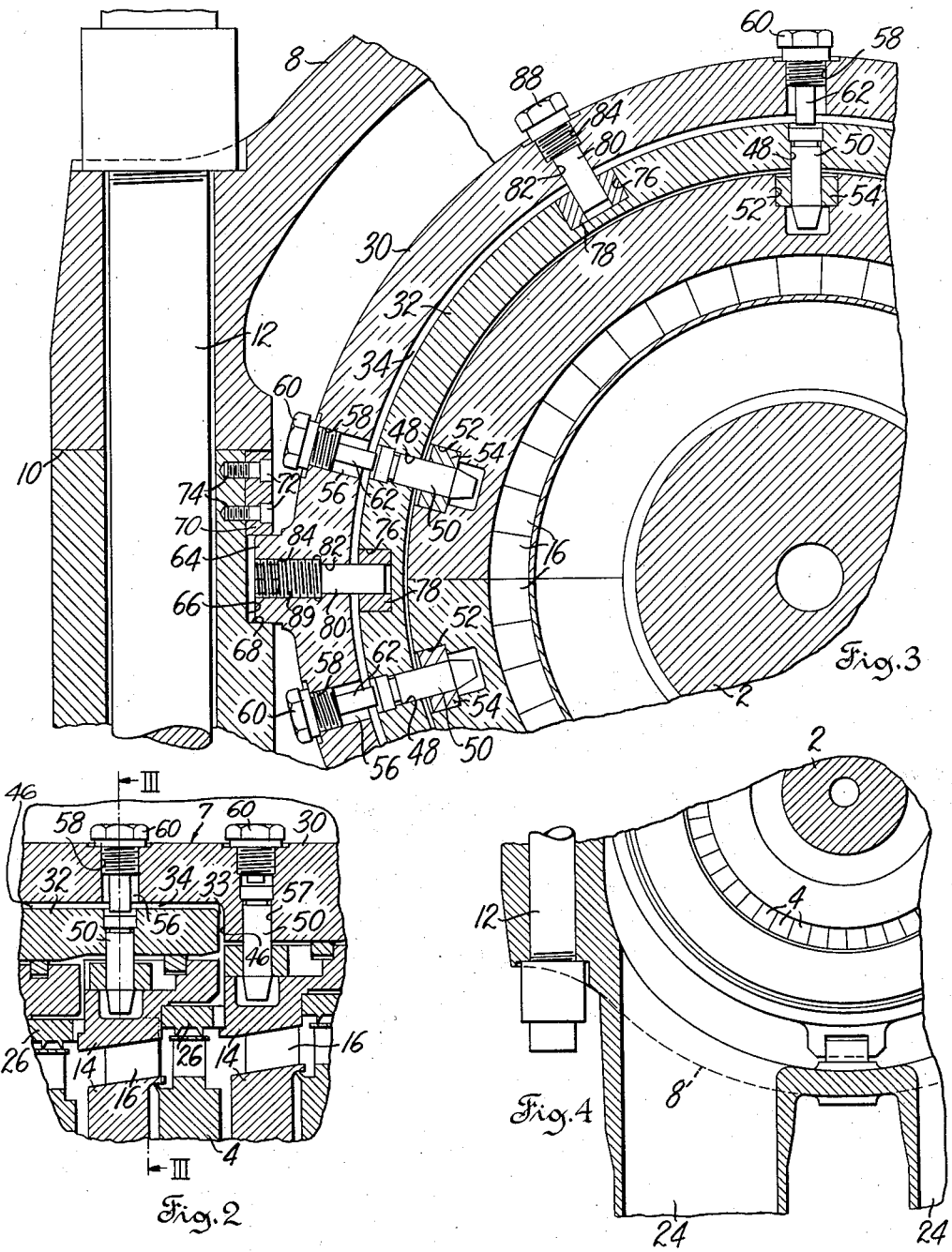

Inventors
John J. Fleischmann
Charles W. Wilson
By Howard B. Scheckman
Attorney

United States Patent Office 2,888,240
Patented May 26, 1959

2,888,240

FLUID COOLED BARREL CYLINDER FOR TURBINES

John J. Fleischmann, Milwaukee, and Charles D. Wilson, West Allis, Wis., assignors to Allis-Chalmers Manufacturing Company, Milwaukee, Wis.

Application March 7, 1956, Serial No. 570,154

8 Claims. (Cl. 253—39.1)

This invention relates to a high pressure, high temperature fluid turbine, and more particularly to a construction permitting the employment of thinner and less costly material.

The present day trend in fluid turbine design is toward higher and higher pressures and temperatures, in the order of 1150° F. and 4000 p.s.i.a. To permit a material to withstand these pressures and temperatures, a solution consisted in providing a split bolted outer casing, and a split bolted inner casing to which the blading is attached. Cooling fluid was then passed between the inner and outer split bolted casings. The use of a bolted inner casing has many drawbacks, the use of bolts, the use of flanges on the inner casing, and the uneven cross section resulting from this arrangement, gives rise to uneven heating and uneven expansion rates, resulting in stresses and distortions in the cylinder at high temperatures. This necessitates the use of heavy casing sections to carry the pressure load. Additionally, the outer casing must be made large to accommodate the bolts and bolted flanges on the inner casing.

This invention provides an arrangement whereby a barrel, which is defined as one or more unitary cylinders, i.e. axially unsplit, is provided inside the casing, and cooling gases are passed between the cylinders, and between the cylinders and the outer split bolted casing. In one embodiment of the invention having a barrel comprising an inner and outer cylinder, the inner cylinder merely acts as a thermo shield and is thin walled so as to be flexible and transmit an internal load of forces directed radially outward, to the outer cylinder which, because it is cooler, is better able to carry the load. In another modification the inner and outer cylinders are made rigid to carry the load. In another modification a single rigid barrel is provided and the outer split casing carries a portion of the load.

A barrel offers the following advantages over a split bolted casing: (1) A barrel of equal cross section allows uniform heating of parts and thereby maintains clearance without rubbing during rapid load changes or starts; (2) where the barrel is divided, thinner wall sections of the cylinders can be heated approximately four times as fast as a single cylinder while maintaining the same stress levels (even a single cylinder can be heated several times faster than a flanged and bolted casing due to its complete symmetry); (3) the inner cylinder of the barrel can be of a dissimilar material than the outer, for conservation of high alloy material; and (4) the use of a barrel allows the use of a considerably smaller diameter outer casing with thinner walls and smaller bolts for fast heating and also a reduction in inspection time.

An object of this invention is to decrease the stress in the material employed in the turbine.

Another object is to provide an arrangement wherein the load on a two cylinder barrel is carried by an outer cooler cylinder.

Another object of this invention is to permit the use of dissimilar materials for the barrel.

Another object is to provide an arrangement wherein the barrel and outer casing carry portions of the load.

Other objects and advantages will appear from the following description considered in conjunction with the attached drawings, in which:

Fig. 2 is an enlarged detail of Fig. 1 showing the cooling passage, between the inner and outer cylinders;

Fig. 3 is a cross sectional view taken in the direction of arrows III—III of Fig. 2, showing the interconnection of the barrel and outer casing;

Fig. 4 is a cross sectional view taken in the direction of arrows IV—IV of Fig. 1, showing the fluid exhaust;

Figure 6:
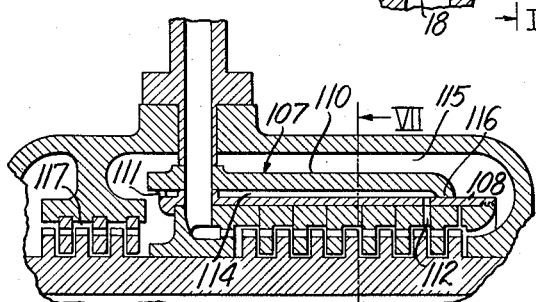
Fig. 6 is a figure similar to a portion of Fig. 1 and shows a second embodiment of the invention illustrating a two cylinder barrel, having a thin flexible inner cylinder.
Figure 8:
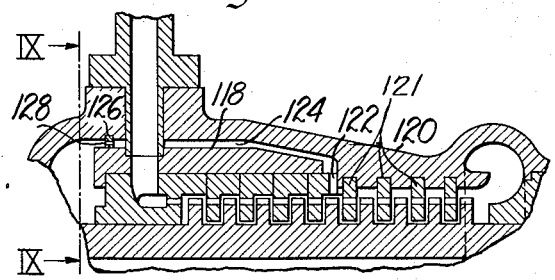
Figure 9:
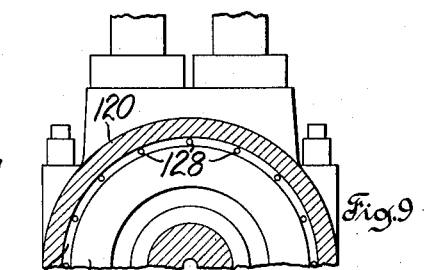

Fig. 8 is a figure similar to Fig. 6 and shows a third embodiment of the invention, illustrating an arrangement wherein a barrel comprising a single cylinder is provided, the split casing being directly connected to a portion of the blading; and Fig. 9 is a cross sectional view taken in the direction of arrows IX—IX of Fig. 8 illustrating the barrel, the outer casing, and the orifices between them.

Figure 1:
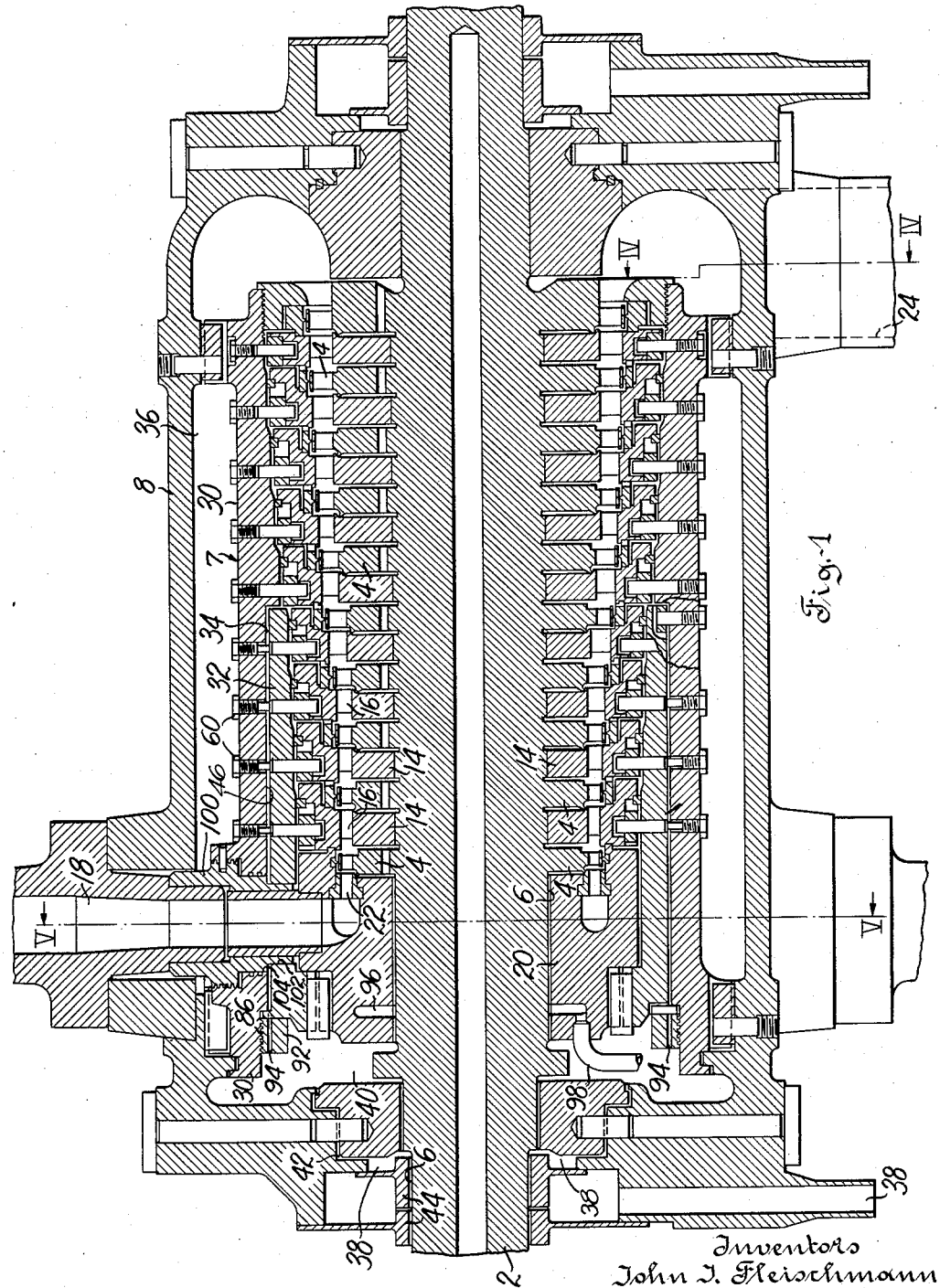
Fig. 1 is a sectional view of the high pressure, high temperature turbine, taken on line I—I of Fig. 5, showing a two cylinder barrel.
Figure 5:
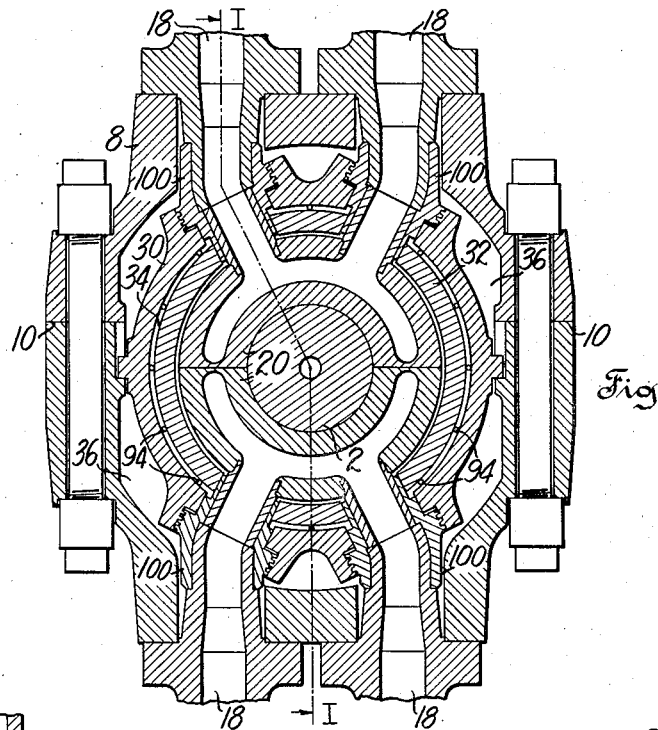
Fig. 5 is a cross sectional view taken in the direction of arrows V—V of Fig. 1 showing the steam inlets, the nozzle chest, and the nozzles and their relationship to the inner and outer barrels.

Referring to Fig. 1, there is disclosed a rotor 2 having a surface 6 from which a plurality of coaxial rows of blading 4 extend. Said rotor is mounted for rotation in a casing 8 which is split so it can be opened for insertion of the rotor 2. Said casing is bolted together as indicated in Figs. 3 or 5, by bolts 12. Surrounding said blading is a barrel 7, indicated by the arrow in Fig. 1. High pressure, high temperature fluid flows through a passage defined by a space between the inner surface of the barrel and the rotor 2. Mounted between adjacent rows of blading 4 are diaphragms 14. Each diaphragm is keyed to barrel 7, which is in turn keyed to casing 8 to hold the diaphragm stationary relative to the blading 4. Each diaphragm carries a nozzle 16 which directs fluid from one row of blading to the next row. Split rings 26 (Fig. 2) are provided to maintain the spacing between the diaphragms.

Fluid is admitted through fluid inlets 18, see Figs. 1 and 5, and is directed by nozzles 22 (Fig. 1) in nozzle chest 20 against blading 4 carried on the surface of rotor 2. Fluid which is at a high temperature and high pressure flows through the blading and imparts its energy to blading 4 to rotate rotor 2. The fluid after it gives up its energy, exits from the blading through an exhaust 24.

An opening defining a passage 33 (Fig. 2) is provided in the barrel to admit a portion of the fluid, which is at a lower temperature than the inlet temperature, through the barrel from the opening of passage 33 through the passage 33 and a passage 34 connected to passage 33 for the purpose of cooling the barrel, as will be described in greater detail.

Referring to Figs. 1, 2, 3, and 5, the barrel 7 comprises an outer cylinder 30, and a spaced inner cylinder 32. Cylinder 32 is carried in a groove 46 (Fig. 2) in the inner surface of cylinder 30. The inner and outer cylinders 30, 32 are spaced from each other to provide the passage 33 and the passage 34. The temperature of the fluid admitted to passages 33, 34 will be lower than turbine inlet temperature because the passage 33 is located intermediate the end portions of the outer cylinder 30 and therefore before fluid reaches passage 33 it has had a portion of its energy extracted by the blading and the temperature will have dropped. The fluid admitted by the passage 33 passes from the passage 33 into the passage 34 between the two cylinders 30 and 32. Cylinder 30 is spaced from the outer casing 8 to also provide a passage 36 (Figs. 1 and 5) for fluid discharged from the last stage of blading 4 to flow back toward the inlet end of the machine. This fluid that flows into passage 36 having passed through all stages of blading 4 will have dropped to a lower temperature than the fluid flowing into passage 33, and therefore the fluid passing into the passage 36 provides cooling between outer casing 8 and outer cylinder 30.

The cooling fluid which passes between outer cylinder 30 and inner cylinder 32 in the passage 34, and the cooling fluid which passes between outer casing 8 and outer cylinder 30 in passage 36, exits through an outlet 38 (Fig. 1). The cooling fluid from passage 36 and passage 34 passes into an opening 40, then through passages 42 to exit 38.

Referring to Figs. 2 and 3, means are provided to interconnect both the inner cylinder 32 and outer cylinder 30 with the diaphragms 14. The inner cylinder 32 has a plurality of openings 48 (Fig. 3) which extend through its surface. Dowels 50 pass through these openings and extend into openings in sleeves 54 carried in openings 52 provided in the diaphragms 14. Outer cylinder 30 is provided with a plurality of openings 56 (Figs. 2 and 3), and 57 (Fig. 2). Openings 56 are threaded at 58 to receive screws 60 having projections 62 (Fig. 3) which extend into openings 48 of inner barrel 32 and prevent dowels 50 from backing out. Openings 57 (only one being shown in Fig. 2) receive both, dowels 50 and screws 60, to similarly lock the corresponding diaphragms to outer cylinder 30.

Means are provided to fixedly interconnect the inner and outer cylinders 30 and 32 against relative rotation. Openings 76 (Fig. 3) are provided partially through inner cylinder 32, and sleeves 78 are provided in openings 76. Dowels 80 are received in sleeves 78. Dowels 80 are supported in outer cylinder 30 in openings having a narrow portion 82 which is smooth to receive the dowel, and a wider portion 84 which is threaded to receive either a screw 88, or 89. The screws 88 or 89 serve to hold dowels 80 in position and in engagement with the inner barrel 32. Dowels 80 as can be seen with reference to the particular one shown in Fig. 3 as being held by the screw 89, support the inner cylinder 32 within cylinder 30 as well as preventing relative rotation between the inner and outer cylinders 32, 30.

Means are also provided to fixedly interconnect outer cylinder 30 with outer casing 8, to support outer cylinder 30. The outer cylinder (Fig. 3) is provided with an extension 64 which is received in an opening 66 in the outer casing. Opening 66 has a shoulder 68 on which extension 64 rests. A key 70 is fastened to outer casing 8 with screws 72 in openings 74 provided in the outer casing 8. The key serves to prevent the outer cylinder from rotating with respect to the outer casing.

To control the amount of cooling fluid which passes between the cylinders 32, 30 through passages 33, 34 (the flow is always from right to left as viewed in Fig. 1), a restriction is provided between the cylinders 32, 30. One end of outer cylinder 30 (to the left in Fig. 1) is threaded at 86 to receive a ring 92. Said ring 92 is provided with orifices 94 (Figs. 1 and 5). Orifices 94 are in line with passage 34 between the inner and outer cylinders. The function of orifices 94 is to provide a restriction in the discharge from passage 34 to build up a back pressure so that only a small quantity of fluid will enter passage 33 from passage 34, so that the temperature drop occurs in the fluid film rather than in the metal.

The main body of the fluid moves on past passage 33 through the remainder of the blading into the exhaust 24. The spacing between the packing 44 (Fig. 1) and the surface 6 is controlled to prevent the flow of excess fluid from the exhaust end 24 of the blading to the outlet 38.

The high temperature fluid tends to leak off, toward the left in Fig. 1, between the nozzle chest 20 and rotor surface 6. An opening 96 is provided in the nozzle chest to intercept the high temperature fluid before it can transfer its heat to the remaining structure. A tube 98, (only a portion shown in Fig. 1) may be used to pipe the fluid which leaks off to the exhaust 24, for example.

Inasmuch as the inner and outer cylinders are unitary, openings 102, 104 must be provided in the cylinders so the fluid can pass through the cylinders to the nozzle chest 20. A thermo shield 100 is placed in the openings 102, 104 in the inner and outer cylinders to shield the inner and outer cylinders from the high pressure, high temperature fluid which flows through inlet 18.

In summary, high pressure, high temperature fluid flows through inlet 18 into nozzle 22 which directs the fluid against the blades 4 carried on the surface 6 of the rotor. Diaphragms 14 which carry nozzles 16 direct the fluid from one row of blading to the next row. The fluid as it moves along the blading imparts its energy to the blading and thereby its temperature and pressure is reduced. Intermediate the path of flow of the fluid past the inner surface of the barrel, a passage 33 (Fig. 2) is provided between the inner and outer cylinders which comprise the barrel. This passage communicates with passage 34 between the inner and outer cylinders. A portion of the fluid which has had some of its energy abstracted in the blading moves into passage 34 between the inner and outer cylinders and flows toward outlet 38 which is adjacent the high pressure, high temperature fluid inlet end. This fluid moves in the opposite direction to the high pressure, high temperature fluid moving through the blading, and this oppositely flowing fluid since it has passed through several stages of the blades 4 has dropped in temperature from its inlet temperature and therefore cools the inner cylinder. The main body of fluid as it continues moving through the blading comes to the end of the outer cylinder 30 in its passage to the exhaust 24. This fluid is cooler than the fluid in passage 34 because this fluid has passed through all of the stages of blades and not just several of the stages as is true of the fluid in passage 34. A portion of this fluid flows into the passage 36 between the outer casing and the outer surface of the outer cylinder. This fluid also moves contra to the fluid which is passing through the blading. This fluid serves to cool the outer cylinder and the casing.

Figure 7:
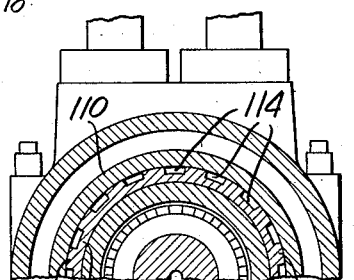
Fig. 7 is a cross sectional view taken in the direction of arrows VII—VII of Fig. 1, showing the longitudinal ribs used to support the inner cylinder.

Referring to Figs. 6 and 7 a modification in the arrangement of the barrels is disclosed. In this embodiment, like the embodiment already described a barrel (indicated by the arrow 107) is divided into an inner cylinder 108 and an outer cylinder 110. However, in this embodiment, unlike the first the inner cylinder extends axially in the direction toward the last stage of blades 4, a distance that is as far as the outer cylinder extends in that same direction. Inner cylinder 108 is made thin and flexible. As can be seen in Fig. 7, the inner cylinder is provided with a plurality of longitudinal ribs 109 which engage the inner surface of the outer cylinder 110. A ring 111, similar to ring 92 (Fig. 1) that has passages 94, is provided to control the amount of fluid which passes between the cylinders 108 and 110. A passage 112 is provided through the inner cylinder.

This passage leads to a space 114 between outer cylinder 110 and inner cylinder 108.

Outer cylinder 110 is provided with a neck portion 116 projecting inwardly to engage the outer surface of inner cylinder 108 to close off space 114. Inner cylinder 108 is connected to the diaphragms in the same manner that, in the embodiment shown in Fig. 2, inner cylinder 2 is connected to diaphragms 14. The inner cylinder 108 is made of a material having a higher resistance to temperature than outer cylinder 110. Inner cylinder 108 serves as a thermo shield that insulates to reduce heat transfer to the outer cylinder 110. The fluid pressure within inner cylinder 108 is higher than in the space 114 because before getting into space 114 the fluid experiences several pressure drops as the fluid passes through the blading and diaphragms before it can get into space 114. The inner cylinder does not carry the load of this pressure differential but merely transmits this load in a manner that will now be described. The inner cylinder, through the ribs 109 (Fig. 7) which are in engagement with the inner surface of outer cylinder 110, transmits the load from the inner cylinder to the outer cylinder. This is analogous, for example, to applying a force to a sheet of tissue paper held on a table, wherein the paper merely transmits the load to the table and does not carry any of the load itself, if the sheet were moved above the table it could not support the load and would tear.

This type of construction permits inner cylinder 108 to be made of a thin cylinder of material having properties able to withstand the high pressure and high temperature of the fluid. The use of this flexible cylinder, permits the transfer of the load to the cooler outer cylinder 110 which is thicker and not subject to such high pressures and temperatures, and which is better able to carry the load. Further inner cylinder 108 being thin, heats rapidly and has less stress resulting from the temperature differential between the inner and outer surfaces of the cylinder. In the embodiment shown in Fig. 6 all of the fluid which moves past the blading except the portion that enters the passage 114 through passage 112 circulates through passage 115 between outer cylinder 110 and the casing. This fluid in this embodiment than passes through a low pressure stage 117 of the turbine and then out of the machine.

Referring to Figs. 8 and 9, another embodiment is shown. Referring to Fig. 8 a barrel comprising a single cylinder 118 is carried in a split outer casing 120. The barrel is rigid and carries its portion of the pressure and is similar to outer cylinder 32 of the device disclosed in Fig. 1. The outer split casing 120 in Fig. 8 also supports some of diaphragms 121 however, and will also carry a portion of the pressure. Barrel 118 is spaced away from outer casing 120 both in a radial and an axial direction to define a space 124. A passage 122 connects the fluid flow passage between barrel 118 and the rotor, with space 124. Fluid that has passed through several stages of blades and diaphragms and therefore dropped in temperature is admitted through passage 122 to the space 124 between the inner barrel and the outer casing to cool these members. The fluid admitted between the barrel and outer casing is directed to an outlet, which is adjacent the inlet, not shown, but is similar to the arrangement disclosed in Fig. 1. A ring 126, similar to ring 94 (Fig. 1), having orifices 128 is carried on barrel 118. Ring 126 provides a restriction in passage 124 so that only a small portion of fluid from the main body of fluid moving through the blading will enter the passage 122.

The advantage of a device employing this modification is that a barrel comprising only one cylinder is employed which would facilitate assembly and maintenance of the blading. Even a barrel comprising only one cylinder will be thinner than an inner split casing as employed in the prior art devices, and a smaller outer casing may be employed with such a barrel.

To facilitate the assembly of the barrel on the rotor, the assembly is performed in the following manner.

The rotor is placed on end, and the diaphragms which are split, are inserted between the blading. The modifications which have a barrel divided into an outer and inner cylinder, have the two cylinders keyed together prior to sliding the barrel onto the rotor. By keying the two cylinders together prior to assembly, a much easier and quicker job can be performed, in addition, inspection may be simplified. After the cylinders as a unit have been slid over the rotor, the cylinders are then doweled to the diaphragms to lock them together. The rotor is then placed on its side in the open one half of the split casing. The outer cylinder is then keyed to the outer casing and the upper one half of the casing is assembled to enclose the rotor, and the casing is bolted together.

Only the material of the nozzle chest and the inner cylinder, need be made of high temperature resistant material, for example, tungsten molybdenum vanadium modified ferritic stainless steel. The outer cylinder which is not subjected to as high a temperature need not be made of high temperature resistant material. The outer cylinder could be cast of 1¼ Cr ½ Mo, for example.

Although several embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In a turbine having high pressure, high temperature inlet fluid; a rotatable rotor having coaxial rows of blading, a split outer casing supporting said rotor for rotation, a plurality of stationary annular diaphragms, a diaphragm between each adjacent row of blading to guide said inlet fluid from one row of blading to the next row, an inlet for admission of said high pressure, high temperature inlet fluid, said inlet fluid from said inlet imparting its energy to said rotor as said inlet fluid travels past said blading, a barrel, said barrel comprising an axially unsplit outer temperature resistant cylinder and an axially unsplit inner cylinder, said inner cylinder made of a material having higher temperature resistance than said outer cylinder to withstand said inlet fluid temperature, said outer cylinder spaced from and within said split casing, said outer cylinder and split casing forming a first cooling passage located therebetween, said inner cylinder spaced from and within said outer cylinder to provide a second cooling passage located therebetween, means fixedly and removably interconnecting said outer cylinder with said outer split casing, means fixedly and removably interconnecting said outer cylinder and said inner cylinder, means fixedly interconnecting said inner cylinder with a plurality of said annular diaphragms carried between said rows of blading on said rotor, a first interconnecting passage interconnecting said second cooling passage with the flow passage between said rotor and said inner cylinder, said first interconnecting passage being located in a radial plane intermediate the axially spaced end rows of said rows of blading so that inlet fluid that has moved through some of said blading may pass into said second cooling passage, a second interconnecting passage interconnecting said first cooling passage with the flow passage between said rotor and said inner cylinder on the discharge side of the last of said rows of blading so that inlet fluid that has moved through all of said blading may pass into said first cooling passage, and an outlet adjacent said fluid inlet for fluid flowing through said cooling passages, said fluid in said first cooling passage cooling said outer cylinder and split casing as fluid in said first cooling passage travels to said outlet in a direction contra to the inlet fluid traveling through said blading and said fluid in said second cooling passage cooling said inner cylinder and outer cylinder as fluid in said second cooling passage travels to said outlet in a direction contra to the inlet fluid traveling through said blading.

2. A device as set forth in claim 1, wherein a restriction is provided between said inner and outer cylinders, said restriction limiting the portion of cooling fluid which flows between said inner and outer cylinders.

3. A device as set forth in claim 1, wherein said inner cylinder is flexible and provided with ribs that abut said outer cylinder, said inner cylinder transmitting its load through said ribs to said outer cylinder.

4. In a turbine having high pressure, high temperature inlet fluid; a rotatable rotor having coaxial blading on its surface, a split outer casing supporting said rotor for rotation, a plurality of stationary annular diaphragms, a diaphragm between each adjacent row of blading to guide said inlet fluid from one row of blading to the next row, an inlet for admission of said high pressure, high temperature inlet fluid, said inlet fluid from said inlet imparting its energy to said rotor as said inlet fluid travels past said blading, a barrel, said barrel comprising an axially unsplit outer temperature resistant cylinder and an axially unsplit flexible inner cylinder, said flexible inner cylinder made of a material of higher temperature resistance than said outer cylinder to withstand said inlet fluid temperature, said outer cylinder spaced from and within said split casing, said outer cylinder and split casing forming a first cooling passage located therebetween, said flexible inner cylinder spaced from and within said outer cylinder to provide a second cooling passage located therebetween, said outer cylinder having a neck portion which projects radially inward to engage said flexible inner cylinder and closes one end of said second cooling passage located between said outer and inner cylinders, means fixedly and removably interconnecting said outer cylinder with said outer split casing, means fixedly and removably interconnecting said outer cylinder and said flexible inner cylinder, means fixedly interconnecting said flexible inner cylinder with a plurality of said annular diaphragms carried between said rows of blading on said rotor, a first interconnecting passage interconnecting said second cooling passage with the flow passage between said rotor and said inner cylinder, said first interconnecting passage being located in a radial plane intermediate the axially spaced end rows of said rows of blading so that said inlet fluid that has moved through some of said blading may pass into said second cooling passage, a second interconnecting passage interconnecting said first cooling passage with the flow passage between said rotor and said inner cylinder on the discharge side of the last of said rows of blading so that said inlet fluid that has moved through all of said blading may pass into said first cooling passage, an outlet adjacent said fluid inlet for fluid flowing through said cooling passages, said fluid in said first cooling passage cooling said barrel and split casing as said fluid in said first cooling passage travels to said outlet in a direction contra to the inlet fluid traveling through said blading and said fluid in said second cooling passage cooling said inner cylinder and said outer cylinder as fluid in said second cooling passage travels to said outlet in a direction contra to the inlet fluid traveling through said blading, a restriction between said inner and outer cylinder, said restriction limiting the portion of fluid which flows in said cooling passage between said cylinders, and ribs provided on said flexible inner cylinder that abut said outer cylinder, said flexible inner cylinder transmitting its load through said ribs to said outer cylinder.

5. In a turbine having high pressure, high temperature inlet fluid; a rotatable rotor having coaxial rows of blading, a split outer casing supporting said rotor for rotation, a plurality of stationary annular diaphragms, a diaphragm between each adjacent row of blading to guide said inlet fluid from one row of blading to the next row, an inlet for admission of said high pressure, high temperature inlet fluid, said inlet fluid from said inlet imparting its energy to said rotor as said inlet fluid travels past said blading, a barrel, said barrel comprising an axially unsplit outer cylinder and an axially unsplit flexible inner cylinder, said inner cylinder provided with ribs that abut said outer cylinder, said inner cylinder transmitting its load through said ribs to said outer cylinder, said outer cylinder spaced from and within said split casing, said outer cylinder and split casing forming a first cooling passage located therebetween, said flexible inner cylinder spaced from and within said outer cylinder to provide a second cooling passage located therebetween, means fixedly and removably interconnecting said outer cylinder with said outer split casing, means fixedly and removably interconnecting said outer cylinder and said flexible inner cylinder, means fixedly interconnecting said flexible inner cylinder with a plurality of said annular diaphragms carried between said rows of blading on said rotor, a first interconnecting passage interconnecting said second cooling passage with the flow passage between said rotor and said inner cylinder, said first interconnecting passage being located in a radial plane intermediate the axially spaced end rows of said rows of blading so that inlet fluid that has moved through some of said blading may pass into said second cooling passage, a second interconnecting passage interconnecting said first cooling passage with the flow passage between said rotor and said inner cylinder on the discharge side of the last of said rows of blading so that inlet fluid that has moved through all of said blading may pass into said first cooling passage, and an outlet adjacent said fluid inlet for fluid flowing through said cooling passages, said fluid in said first cooling passage cooling said barrel and split casing as said fluid in said first cooling passage travels to said outlet in a direction contra to the inlet fluid traveling through said blading and said fluid in said second cooling passage cooling said inner cylinder and outer cylinder as fluid in said second cooling passage travels to said outlet in a direction contra to the inlet fluid traveling through said blading.

6. A device as set forth in claim 5, wherein a restriction is provided between the inner and outer cylinders to limit the portion of fluid that flows between the cylinders to cool them.

7. A device as set forth in claim 5 wherein said outer cylinder is provided with a neck portion that receives said flexible inner cylinder to close the cooling space between the inner and outer cylinders at one end.

8. A device as set forth in claim 7 wherein said inner cylinder exposed to said high temperature inlet fluid is made of material of higher temperature resistance than said outer cylinder, to withstand said high temperature of said inlet fluid.

References Cited in the file of this patent

UNITED STATES PATENTS

| 2,282,894 | Sheldon | May 12, 1942 |
| 2,304,994 | Franck | Dec. 15, 1942 |
| 2,815,645 | Downs | Dec. 10, 1957 |

FOREIGN PATENTS

| 655,235 | Great Britain | July 11, 1951 |